(12) United States Patent
Bönnemann et al.

(10) Patent No.: US 6,491,842 B1
(45) Date of Patent: Dec. 10, 2002

(54) ANTICORROSIVE MAGNETIC NANOCOLLOIDS PROTECTED BY PRECIOUS METALS

(75) Inventors: Helmut Bönnemann, Essen; Werner Brijoux, Oberhausen; Rainer Brinkmann, Mülheim an der Ruhr; Michael Wagener, Bremen, all of (DE)

(73) Assignees: Studiengesellschaft Kohle mbH, Mulheim an der Ruhr (DE); Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/622,081

(22) PCT Filed: Feb. 9, 1999

(86) PCT No.: PCT/EP99/00835

§ 371 (c)(1),
(2), (4) Date: Aug. 11, 2000

(87) PCT Pub. No.: WO99/41758

PCT Pub. Date: Aug. 19, 1999

(30) Foreign Application Priority Data

Feb. 14, 1998 (DE) ........................................ 198 06 167

(51) Int. Cl.[7] .............................. B01F 3/12; B01F 17/18; H01F 1/14; H01F 1/44
(52) U.S. Cl. ................................ 252/62.55; 252/62.52; 359/280; 427/127; 436/526; 516/33; 516/98
(58) Field of Search .................. 516/98, 33; 252/62.55, 252/62.52; 427/127; 436/526; 359/280

(56) References Cited

U.S. PATENT DOCUMENTS

| | | | | |
|---|---|---|---|---|
| 3,650,601 A | * | 3/1972 | Bierlein | .................. 359/280 X |
| 3,764,540 A | * | 10/1973 | Khalafalla et al. | ........ 252/62.55 |
| 4,101,311 A | * | 7/1978 | Aonuma et al. | ..... 252/62.55 X |
| 4,687,748 A | * | 8/1987 | Schröder | .................... 436/526 |
| 5,007,513 A | * | 4/1991 | Carlson | ............... 252/62.52 X |
| 5,580,492 A | * | 12/1996 | Bönnemann et al. | 252/62.55 X |
| 5,928,958 A | * | 7/1999 | Pilgrimm | .................... 436/526 |
| 6,159,396 A | * | 12/2000 | Fujita et al. | ......... 252/62.52 X |

FOREIGN PATENT DOCUMENTS

| | | | |
|---|---|---|---|
| EP | 0 423 627 | * | 4/1991 |
| WO | WO90/15423 | * | 12/1990 |

OTHER PUBLICATIONS

Patent Abstracts of Japan, vol. 008, No. 111 (E–246), May 24, 1984 & JP 59 027505A (Hitachi Maxell KK) Feb. 14, 1984.*

Rivas J. Et Al.: "Structural and Magnetic Characterization of Co Particles Coated with Ag", Journal of Applied Physics, vol. 76, No. 10, Part 02, Nov. 15, 1994 XP 000508785.*

* cited by examiner

*Primary Examiner*—Richard D. Lovering
(74) *Attorney, Agent, or Firm*—Norris McLaughlin & Marcus

(57) ABSTRACT

The invention relates to new single- or multi-metallic magnetic colloid particles (for example, Fe, Co, Ni, Fe/Co) having a size of up to 20 nm, the surface of which is protected against corrosion by precious metals, such as Pd, Ag, Pt or Au. The invention also relates to a method for producing such materials. In isolated form or in solution said materials are used among other things as sealing media against dust and gas in magnetic fluid seals (liquid O ring), for lubricating and mounting rotating shafts (magnetic levitation bearing), for the magnetooptic storage of information as well as for the magnetic marking of cells and their separation in biological samples or for the local administration of medicines.

5 Claims, 6 Drawing Sheets

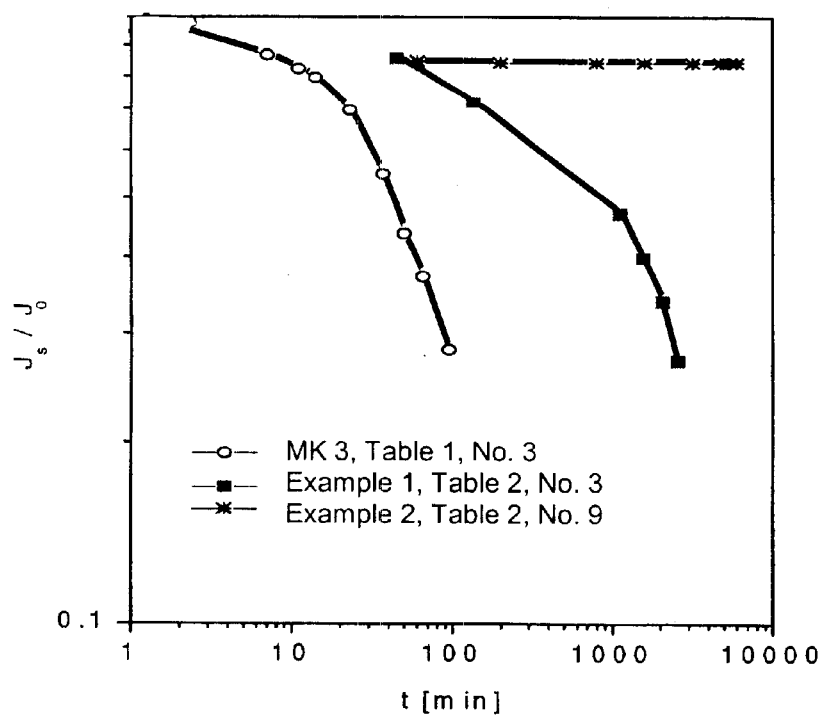
Fig. 1a: Corrosion stability of Fe colloids with and without Au protection
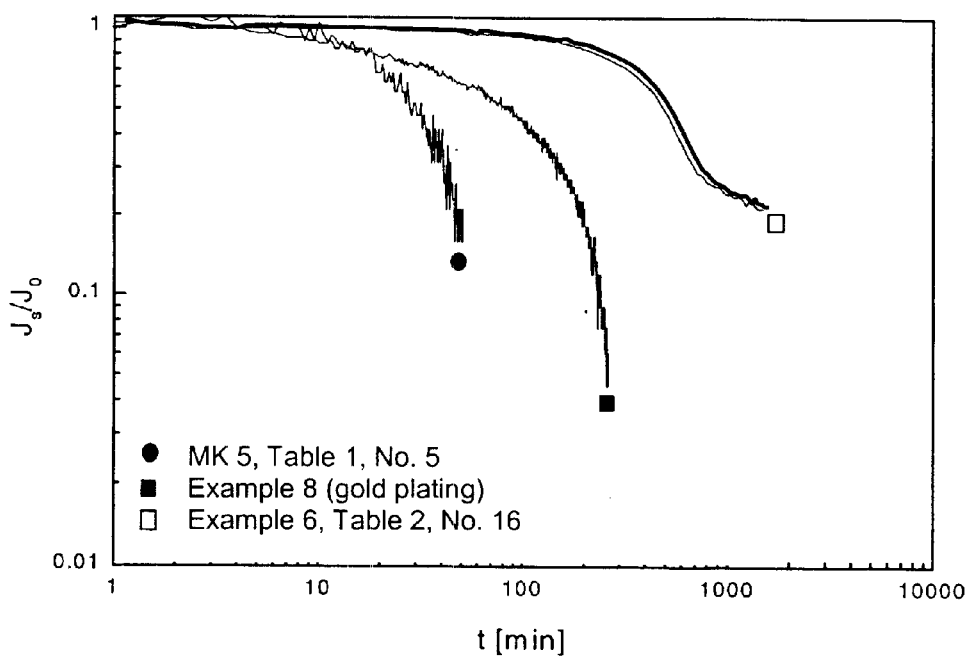
Fig. 1b: Corrosion stability of Co colloids with and without Au protection UV-VIS spectra of colloid solutions in THF, layer thickness: 1mm
━ Colloid under inert gas ━ Colloid under air
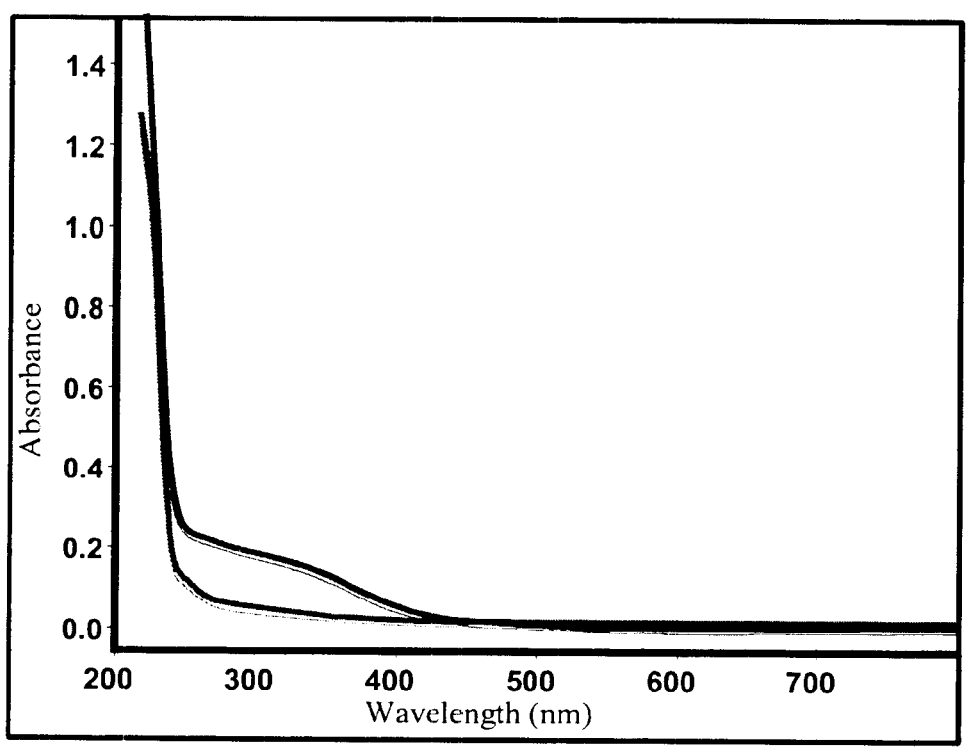
Fig. 2: Magnetic metal colloid employed = MK2, Table 1, No. 2

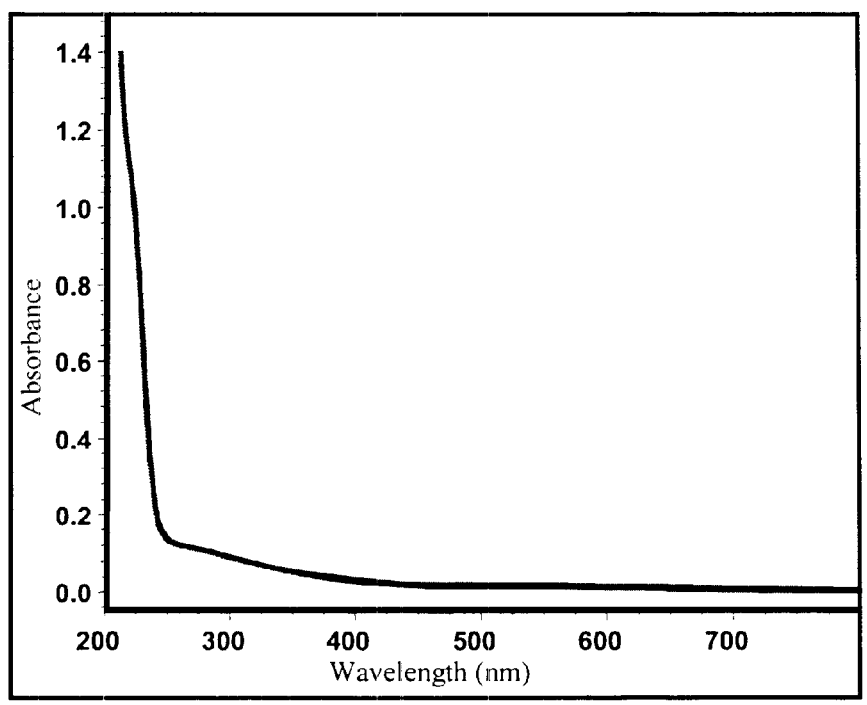
Fi. 3: Precious-metal protected magnetic metal colloid, Example 1, Table 2, No. 3

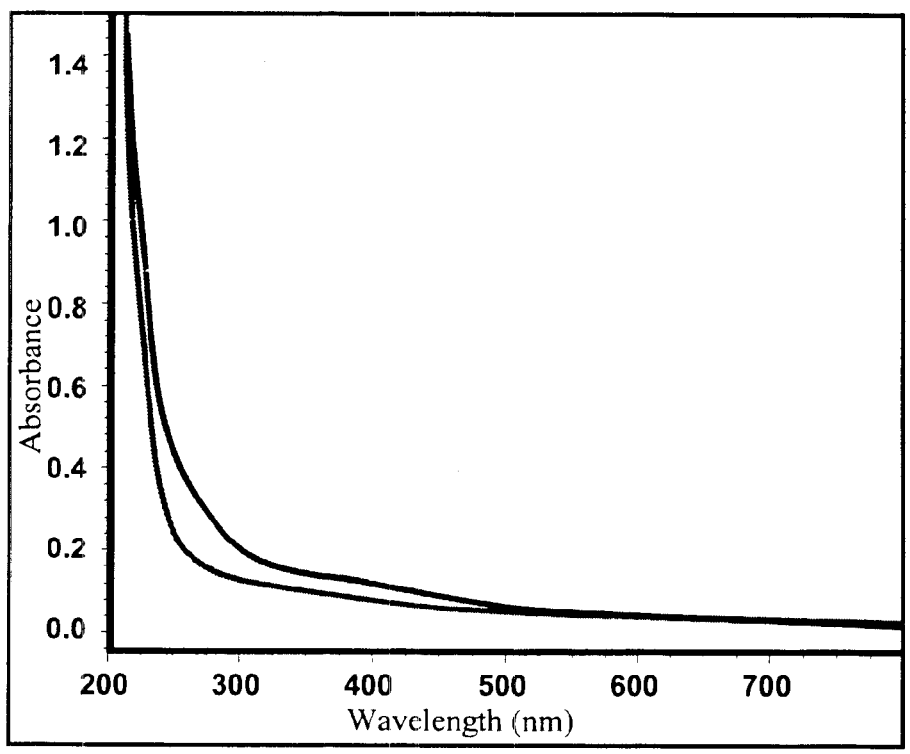
Fig. 4: Magnetic metal colloid employed = MK5, Table 1, No. 5

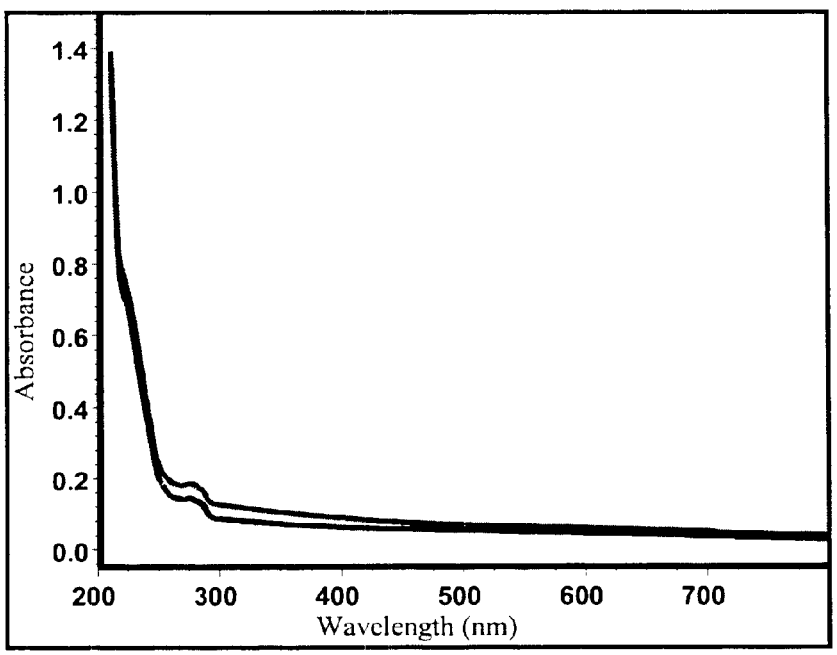
Fig. 5: Precious-metal protected magnetic metal colloid, Example 6, Table 2, No. 16

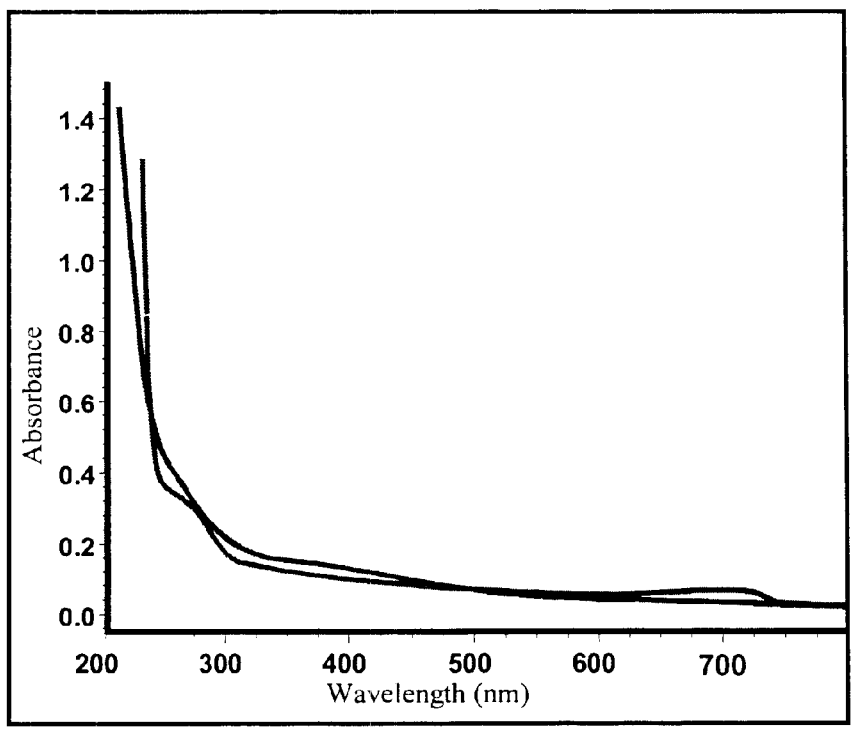
Fig. 6: Comparative Example, gold plating of Co colloid, Example 8

ANTICORROSIVE MAGNETIC NANOCOLLOIDS PROTECTED BY PRECIOUS METALS

This application is a 371 of PCT/EP99/00835 filed on Feb. 9, 1999.

The present invention relates to novel mono- and polymetallic magnetic colloid particles (e.g., Fe, Co, Ni, Fe/Co) of a size of up to 20 nm the surface of which is protected from corrosion by precious metals, e.g., Pd, Ag, Pt or Au, and a process for the preparation of these materials.

Various methods are known for the preparation of unprotected colloidal magnetic metals, especially Fe, Co and Ni, e.g., salt reduction (G. Schmid (Ed.), Clusters and Colloids, VCH, 1994, EP 423 627, DE 44 43 705 and U.S. Pat. No. 5,620,584), thermal, photochemical and sonochemical decomposition of metal carbonyls and nitrosyl complexes (K. S. Suslick, T. Hyeon, M. Fang, A. A. Cichowlas in: W. Moser (Ed.), Advances Catalysts and Nanostructured Materials, Chapter 8, p. 197, Academic Press, 1996), and the reduction of salts or the decomposition of carbonyl compounds in micellar solutions (O. A. Platonova, L. M. Bronstein, S. P. Solodovnikov, I. M. Yanovskaya, E. S. Obolonkova, P. M. Valetsky, E. Wenz, M. Antonietti, Colloid Polym. Sci. 275, 1997, 426). The long-term stability of such previously proposed colloidal magnetic metals against atmospheric oxygen is unsatisfactory, however (see Comparative Examples: Table 1, Nos. 2, 3 and 5, FIGS. 1a, 2 and 4).

Therefore, it has been the object of the present invention to provide a process for the preparation of corrosion-stable colloidal magnetic nanometals of a size of up to 20 nm by protecting the particle surface against corrosive attack by means of precious metal coatings.

Japanese Patent JP 0727 2922 AZ describes the preparation of anticorrosive, resin-bound Fe magnets protected by three coatings with, inter alia, precious metals. However, they are exclusively coated magnetic bulk materials which are not suitable for nanotechnology and magnetic fluids. A process for the preparation of precious-metal protected magnetic nanocolloid particles of a size of up to 20 nm has not been known. Toshima et al. describe the preparation of Pd-Pt bimetal colloids (1.5–5.5 nm) with a controllable core-shell structure (Y. Wang and N. Toshima, J. Phys. Chem. B, 1997, 101, 5301). Schmid et al. describe the preparation of gold-coated Pd particles of a size of from 20 to 56 nm having a layer structure (G. Schmid, H. West, J. -O. Maim, J. -O. Bovin, and C. Grenthe, Chem. Eur. J. 1996, 1099). However, the mentioned processes cannot be transferred to a combination of magnetic metal (Fe, Co, Ni) and precious metal coating. J. Sinzig tried to protect the particle surface of an N(octyl)$_4$-stabilized Co colloid from corrosion by chemical plating with elemental gold (J. Sinzig, Proefschrift, p. 74, Rijksuniversiteit te Leiden (NL) 1997). The following redox process occurs at the Co surface: 12 Co$^{(0)}$+2 AuCl$_3$→Co$_9$Au$_2$+3 CoCl$_2$. Although the oxidation stability of the materials can be enhanced in this way, it is still insufficient for the mentioned applications (see Comparative Example: Example No. 8, Table 1 No. 6, FIGS. 1b and 6).

It has now surprisingly been found that corrosion-stable magnetic nanocolloids can be obtained by preparing, e.g., Fe, Co, Ni or Fe/Co alloy colloids by methods known from the literature (see above) or generating them in situ, treating them, under extremely strict exclusion of atmospheric oxygen in organic solvents, with strong reductants, e.g., hydrides of elements from main groups 1 to 3 of the Periodic Table, complex hydrides of these elements or of tetraalkylammonium, or reducing organometallic compounds of main groups 1 to 4 of the Periodic Table, and adding precious metal salts, e.g., of Pd, Ag, Pt or Au, preferably in solution in a molar ratio (Colloid:precious metal salt) of >1:1, preferably 1:0.3, to the resulting mixture. Suitable solvents include aliphatic and aromatic solvents and ethers, and suitable reductants include, e.g., the above mentioned hydrides and organometallic compounds in a molar ratio (reductant:colloid) of at least 1:1, preferably >3:1.

The thus obtained precious-metal protected anticorrosive magnetic nanocolloids of a size of up to 20 nm have long-term stability; for example, in the Au-protected Fe colloid, a decrease of magnetization J by corrosion cannot be detected until the measurement is terminated after 100 hours. The materials can be employed in isolated form or in solution, without intending to limit their use, e.g., as a sealing medium against dust and gases in magnetic fluid seals (liquid O ring), for the lubrication and bearing of rotating shafts (magnetic levitation bearing), for magnetooptical storage of information, e.g., in compact disks and minidisks, and further, after applying an additional cell-compatible coating, for the magnetic labeling of cells and their magnetic separation in biological samples, or for the topical application of medicaments. The superior corrosion stability of the new materials as compared to unprotected magnetic nanocolloids of similar size will be illustrated by the following Examples (Examples 1 to 7, Table 2, FIGS. 1a, 1b, 3 and 5).

BRIEF DESCRIPTION OF DRAWINGS

FIG. 1a shows corrosion stability of Fe colloids with and without Au protection.

FIG. 1b shows corrosion stability of Co colloids with and without Au protection.

FIG. 2 shows the UV/Vis spectra of Fe colloid with Au protection using $(C_8H_{17})_4NBr$ as stabilizer.

FIG. 3 shows the UV/Vis spectrum of Fe colloid with Au protection using $(C_8H_{17})_4NBEt_3H$ as reductant.

FIG. 4 shows the UV/Vis spectrum of Co colloid with Au protection using $(C_8H_{17})_4NCl$ as stabilizer.

FIG. 5 shows the UV/Vis spectrum of Co colloid with Au protection using $(C_8H_{17})_4NBEt_3H$ as reductant.

FIG. 6 shows UV/Vis spectra of a comparative example of gold plating of Co colloid vs. Co colloid with Au protection using $(C_8H_{17})_4NBr$ as stabilizer.

EXAMPLE 1

Under argon as a protective gas, 1.3 g (1.43 mmol Fe) of Fe colloid (identification symbol: MK2) is dissolved in 50 ml of THF in a 500 ml flask, and a solution of 2.61 g (4.61 mmol) of $(C_8H_{17})_4NBEt_3H$ in 27 ml of THF is added. Under exclusion of light, a solution of 0.146 g (0.48 mmol) of AuCl$_3$ in 185 ml of THF is added dropwise at room temperature within 14 h. Any precipitated reaction products are removed by filtration through a D4 glass frit, and the resulting solution is concentrated. After 3 h of drying in vacuo (0.1 Pa) at 40° C., 5.5 g of brown-black, wax-like, Au-protected Fe colloid is obtained (Table 2, No. 3, FIGS. 1a and 3).

For determining the magnetization, 1 g of a dried metal colloid is redispersed in 2 ml of solvent (toluene, THF) and placed on a magnetic scale in an open cylindrical glass jar having a diameter of 2 cm. When an NdFeB magnet having a high magnetic field strength of BR=1.1 T and a low distance of magnet to metal colloid of 5 mm is used, it can be considered that the colloid particles are magnetically saturated in the liquid. Therefore, the weight ratio of Go/G (t), measured at time t, is equal to the ratio of the magnetization at time t to the initial magnetization, J(T)/JO.

EXAMPLE 2

The same procedure as in Example 1 is used, except that 0.287 g (3 mmol Fe) of Fe colloid (identification symbol: MK3) in 100 ml of THF and 5.55 g (9.8 mmol) of $(C_8H_{17})_4NBEt_3H$ in 58 ml of THF are used, 0.3 g (1 mmol) of $AuCl_3$ dissolved in 377 ml of THF is added dropwise within 14 h, and 13.5 g of brown-black, viscous, Au-protected Fe colloid is obtained (Table 2, No. 9, FIG. 1a).

EXAMPLE 3

The same procedure as in Example 1 is used, except that 0.9 9 (1 mmol Fe) of Fe colloid (identification symbol: MK2) in 40 ml of THF is used, 0.55 g (1.5 mmol) of Al(octyl)$_3$ is added, and 0.1 g (0.33 mmol) of $AuCl_3$ dissolved in 94 ml of THF is added dropwise within 16 h, and 2.2 g of brown-black, Au-protected Fe colloid is obtained (Table 2, No. 7).

EXAMPLE 4

The same procedure as in Example 1 is used, except that 2.9 g (3.2 mmol Fe) of Fe colloid (identification symbol: MK2) in 80 ml of THF and 6.0 9 (10.6 mmol) of $(C_8H_{17})_4NBEt_3H$ dissolved in 32 ml of THF are used, and 0.37 g (1.1 mmol) of $PtCl_4$ dissolved in 306 ml of THF is added dropwise within 16 h to obtain 14.5 g of Pt-protected Fe colloid (Table 2, No. 13).

EXAMPLE 5

The same procedure as in Example 1 is used, except that 0.9 9 (1.1 mmol Fe) of Fe colloid (identification symbol: MK4) in 40 ml of THF and 0.18 g (1.7 mmol) of $LiBEt_3H$ dissolved in 2 ml of THF are used, and 0.11 g (0.36 mmol) of $AuCl_3$ dissolved in 112 ml of THF is added dropwise within 16 h to obtain 1.3 g of Au-protected Fe colloid (Table 2, No. 11).

EXAMPLE 6

The same procedure as in Example 1 is used, except that 3.1 g (3 mmol Co) of Co colloid (identification symbol: MK5) in 300 ml of THF and 5.43 g (9.6 mmol) of $(C_8H_{17})_4NBEt_3H$ dissolved in 33 ml of THF are used, and 0.3 g (1 mmol) of $AuCl_3$ dissolved in 500 ml of THF is added dropwise within 18 h to obtain 13.5 g of dark brown, wax-like, Au-protected Co colloid (Table 2, No. 16, FIGS. 1b and 5).

EXAMPLE 7

The same procedure as in Example 1 is used, except that 0.83 g (5 mmol Co) of Co colloid (identification symbol: MK7) in 300 ml of THF and 5.43 9 (9.6 mmol) of $(C_8H_{17})_4NBEt_3H$ dissolved in 33 ml of THF are used, and 0.3 g (1 mmol) of $AuCl_3$ dissolved in 300 ml of THF is added dropwise within 16 h obtain 7.2 g of black-brown, viscous, Au-protected Co colloid (Table 2, No. 17).

EXAMPLE 8 (Comparative Example: Gold Plating of Co Colloid)

Under argon as a protective gas, 6.5 g (6 mmol Co) of Co colloid (identification symbol: MK6) is dissolved in 250 ml of toluene in a 500 ml flask, and 3 g (1 mmol) of solid $AuCl_3$ is added at room temperature. Within 16 h, the $AuCl_3$ dissolves, and a brown-black solution containing low amounts of a finely dispersed gray-black precipitate forms. This is removed by filtration through a D4 glass frit, and after concentrating and 3 h of drying in vacuo (0.1 Pa) at 30° C., 6.8 g of black solid Co-Au colloid is obtained (FIGS. 1b 6).

TABLE 1

Magnetic metal colloids employed

| No. | Metal | Stabilizer | Mean particle size [nm] | Identification symbol |
|---|---|---|---|---|
| 1 | Fe | $(C_8H_{17})_4NCl$ | 2–3 | MK1 |
| 2 | Fe | $(C_8H_{17})_4NBr$ | 3–4 | MK2 |
| 3 | Fe | N-lauroylsarcosine Na salt | 5–6 | MK3 |
| 4 | Fe | 2-(dimethyidodecyl-ammonio)acetate Rewoteric AM DML | — | MK4 |
| 5 | Co | $(C_8H_{17})_4NCl$ | 2–3 | MK5 |
| 6 | Co | $(C_8H_{17})_4NBr$ | 2–3 | MK6 |
| 7 | Co | Korantin SH (BASF) | 7–11 | MK7 |
| 8 | Ni | $(C_8H_{17})_4NCl$ | 2–3 | MK8 |
| 9 | $Fe_2Co$ | $(C_8H_{17})_4NBr$ | 2–3 | MK9 |

TABLE 2

Synthesis of precious-metal protected magnetic nanocolloids

| | Metal colloid | | | Reductant | | | Precious metal salt | | | | |
|---|---|---|---|---|---|---|---|---|---|---|---|
| No. | Metal | Ident. | mmol | THF, ml | Formula | mmol | THF, ml | Formula | mmol | THF, ml | Time [h] | Product [g] |
| 1 | Fe | MK1 | 3 | 173 | $(C_8H_{17})_4NBEt_3H$ | 9.6 | 48 | $AuCl_3$ | 1 | 370 | 16 | 12.8 |
| 2 | Fe | MK2 | 1 | 50 | $(C_6H_{13})_4NBEt_3H$ | 3.2 | 16 | $AuCl_3$ | 0.33 | 160 | 14 | 3.5 |
| 3 | Fe | MK2 | 1.43 | 50 | $(C_8H_{17})_4NBEt_3H$ | 4.61 | 27 | $AuCl_3$ | 0.48 | 185 | 14 | 5.5 |
| 4 | Fe | MK2 | 1 | 50 | $(C_{12}H_{25})_4NBEt_3H$ | 3.2 | 16 | $AuCi3$ | 0.33 | 160 | 14 | 4.5 |
| 5 | Fe | MK2 | 2.9 | 100* | $(C_8H_{17})_4NBEt_3H$ | 9.3 | 24 | $AuCl_3$ | 1 | 303 | 16 | 12.7 |
| 6 | Fe | MK2 | 2.9 | 100 | $LiBEt_3H$ | 4.4 | 22* | $AuCl_3$ | 1 | 303 | 18 | 8.8 |
| 7 | Fe | MK2 | 1 | 40 | Al(octyl)$_3$ | 1.5 | — | $AuCl_3$ | 0.33 | 94 | 16 | 2.2 |
| 8 | Fe | MK2 | 1 | 40 | Al(octyl)$_3$ | 1.5 | — | $Au[(octyl)_4N]_3Br_3Cl_3$ | 0.33 | 94 | 16 | 2.4 |

TABLE 2-continued

Synthesis of precious-metal protected magnetic nanocolloids

| | Metal colloid | | | Reductant | | | Precious metal salt | | | Time | Product |
|---|---|---|---|---|---|---|---|---|---|---|---|
| No. | Metal | Ident. | mmol | THF, ml | Formula | mmol | THF, ml | Formula | mmol | THF, ml | [h] | [g] |
| 9 | Fe | MK3 | 3 | 100 | $(C_8H_{17})_4NBEt_3H$ | 9.8 | 58 | $AuCl_3$ | 1 | 377 | 16 | 5.8 |
| 10 | Fe | MK3 | 1.64 | 57.5 | $(C_8H_{17})_4NBEt_3H$ | 5.62 | 17 | $AuBr_3$ | 0.55 | 250 | 16 | 3.1 |
| 11 | Fe | MK4 | 1.1 | 40 | $LiBEt_3H$ | 1.7 | 2 | $AuCl_3$ | 0.36 | 112 | 16 | 1.3 |
| 12 | Fe | MK2 | 3.1 | 80 | $(C_8H_{17})_4NBEt_3H$ | 9.6 | 29 | $Pd(CH_3CCO^-)_2$ | 1 | 278 | 16 | 12.2 |
| 13 | Fe | MK2 | 3.2 | 80 | $(C_8H_{17})_4NBEt_3H$ | 10.6 | 32 | $PtCl_4$ | 1.1 | 306 | 16 | 14.5 |
| 14 | Fe | MK2 | 2.9 | 80 | $(C_8H_{17})_4NBEt_3H$ | 9.6 | 29 | Ag neodecanoate | 1 | 278 | 16 | 13.2 |
| 15 | Fe | MK2 | 2.9 | 100 | $(C_8H_{17})_4NBEt_3H$ | 9.3 | 24 | Ag neodecanoate | 1 | 323* | 18 | 12.9 |
| 16 | Co | MK5 | 3 | 300 | $(C_8H_{17})_4NBEt_3H$ | 9.6 | 33 | $AuCl_3$ | 1 | 500 | 18 | 13.5 |
| 17 | Co | MK7 | 5 | 300 | $(C_8H_{17})_4NBEt_3H$ | 9.6 | 33 | $AuCl_3$ | 1 | 300 | 16 | 7.2 |
| 18 | Co | MK7 | 5 | 300 | $(C_8H_{17})_4NBEt_3H$ | 19.2 | 66 | $AuCl_3$ | 2 | 600 | 16 | 12.6 |
| 19 | Co | MK7 | 5 | 300 | $(C_8H_{17})_4NBEt_3H$ | 28.8 | 99 | $AuCl_3$ | 3 | 900 | 16 | 18.0 |
| 20 | Ni | MK9 | 2.76 | 97 | $(C_8H_{17})_4NBEt_3H$ | 8.83 | 26.7 | $AuCl_3$ | 0.92 | 340 | 16 | 12.2 |
| 21 | $Fe_2Co$ | MK10 | 3.2 | 100 | $(C_8H_{17})_4NBEt_3H$ | 10.6 | 27.8 | $AuCl_3$ | 1.1 | 300 | 16 | 12.1 |

*Solvent toluene

What is claimed is:

1. A process for the preparation of precious-metal protected, anticorrosive metal and alloy colloids, said process comprising:
   a) treating previously prepared or in situ prepared magnetic nanocolloids with a reductant in an organic solvent to form a resulting mixture, and
   b) adding precious metal salts to the resulting mixture.

2. The process according to claim 1, wherein Fe, Co, Ni or Fe/Co colloids are employed as said previously prepared or in situ prepared magnetic nanocolloids.

3. The process according to claim 1, wherein the reductant is selected from the group consisting of hydrides of elements from main groups 1 to 3 of the Periodic Table or complex hydrides of these elements or of tetraalkylammonium.

4. The process according to claim 1, wherein the reductant is selected from the group consisting of reducing organometallic compounds of main groups 1 to 4 of the Periodic Table.

5. A process for the preparation of preciousmetal protected, anticorrosive metal and alloy colloids, said process comprising:
   a) treating previously prepared or in situ prepared magnetic nanocolloids with a reductant in an organic solvent to form a resulting mixture, wherein the reductant is selected from the group consisting of:
      i) hydrides of elements from main groups 1 to 3 of the Periodic Table or complex hydrides of these elements or of tetraalkylammonium, and
      ii) reducing organometallic compounds of main groups 1 to 4 of the Periodic Table, and
   b) adding precious metal salts to the resulting mixture.

* * * * *